United States Patent [19]

Riccio

[11] 3,878,973
[45] Apr. 22, 1975

[54] METERED DOSE DISPENSER
[75] Inventor: Pasquale R. Riccio, Salem, N.H.
[73] Assignee: Ciba-Geigy Corporation, Ardsley, N.Y.
[22] Filed: Oct. 31, 1973
[21] Appl. No.: 411,265

[52] U.S. Cl. .............................................. 222/319
[51] Int. Cl. ........................................... G01f 11/38
[58] Field of Search ........... 222/135, 137, 145, 319, 222/162, 387, 402.24, 402.2, 257, 260; 141/352, 353, 354; 239/350

[56] References Cited
UNITED STATES PATENTS
2,881,810   4/1959   Breitenstein ........................ 141/353
3,499,584   3/1970   Warren .......................... 222/402.24

Primary Examiner—Stanley H. Tollberg
Attorney, Agent, or Firm—Wenderoth, Lind & Ponack

[57] ABSTRACT

A metered dose dispenser has a piston-cylinder means for containing a body of liquid to be dispensed and having one member engageable by the finger of a user to exert pressure on the liquid. A metering valve means is mounted on the other member of the piston-cylinder means and has one portion which projects out of the said other member of the piston-cylinder means. The metering valve means is movable into and out of the other member of the piston-cylinder means for valving a metered amount of liquid from the piston-cylinder means when it is moved into the other member of the piston-cylinder means. The pressure on the liquid within the piston-cylinder means exerted by the finger pressure on the one member thereof is transmitted through the liquid being passed by the metering valve means and causes the metering valve means to emit the metered amount of liquid in a squirt.

The device can be combined with a device for compressing air and, after the completion of the compression, suddenly releasing the compressed air and delivering it to a nozzle. In the combined structure there is provided a passage for conducting the liquid which is passed by the metering valve means to the nozzle where it is combined with the compressed air and emitted from the nozzle as a spray of find droplets of the liquid in compressed air.

8 Claims, 8 Drawing Figures

METERED DOSE DISPENSER

This invention relates to a device for dispensing a measured dose of a liquid and more particularly relates to an extremely simple device which will dispense a squirt of liquid, and which can be used by itself or can be readily combined with a means for producing air under pressure in order to dispense a spray of the liquid in compressed air.

BACKGROUND OF THE INVENTION AND PRIOR ART

The art of dispensing liquids is rather highly developed. there are many simple devices made of plastic and the like which dispense liquid, such as throwaway syringes and hypodermic needles. However, these devices are designed to dispense the entire contents in one operation. There are also many devices which dispense repeated squirts of a measured amount of liquid. However, most of these devices are somewhat complex and therefore rather expensive to make. They are therefor not suitable for making on a mass production basis and to be sufficiently inexpensive to be throw-aways. Insofar as is known, there has never been a device which combines the simplicity of the throwaway devices with the measured dose dispensing devices.

However, there is a need for such a device for dispensing repeated squirts of a measured amount of liquid, which is simple and inexpensive.

OBJECTS AND BRIEF DESCRIPTION OF THE INVENTION

It is an object of the present invention to provide a simple device for dispensing repeated squirts of a measured amount of liquid.

It is a further object of the invention to provide such a device which is simple to make and reliable in operation, so that it can be made inexpensively and sold at a low price so that it can be thrown away after use.

It is a still further object of the invention to provide such a device which can be incorporated into an air pressurizing device for dispensing a spray of liquid in compressed air in such a way as to meter the amount of liquid dispensed by the pressurized air.

These objects are achieved by providing a device which has a piston-cylinder means for containing a body of liquid to be dispensed and having one member engageable by the finger of a user to move it toward the other for placing the liquid therein under pressure. A metering valve means is mounted on the other member of the piston cylinder has one portion which projects out of the said other member of the piston-cylinder means so that it can be engaged by another finger of the user to exert pressure on the metering valve means in the opposite direction from the pressure on the one member of the piston-cylinder means. The metering valve means is moveable into and out of the other member of the piston-cylinder means for valving a metered amount of liquid from the piston-cylinder means when it is moved into the other member of the piston-cylinder means, the pressure on the liquid within the piston-cylinder means exerted by the finger pressure on the one member therof being transmitted through the liquid being passed by the metering valve means and causing the metering valve means to emit the metered amount of liquid in a squirt.

The device can be combined with a device for compressing air and, after the completion of the compression, suddenly releasing the compressed air and delivering it to a nozzle. In the combined structure there is provided a passage for conducting the liquid which is passed by the metering valve means to the nozzle where it is combined with the compressed air and emitted from the nozzle as a spray of fine droplets of the liquid in compressed air.

BRIEF DESCRIPTION OF THE DRAWINGS

The invention will be further described in greater detail in the following specification, taken together with the accompanying drawings, in which.

DETAILED DESCRIPTION OF THE INVENTION

Figure 1:
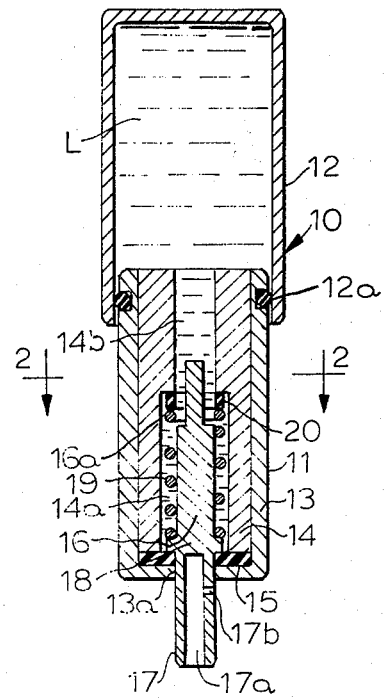
FIG. 1 is a sectional elevation view of the device for dispensing a measured dose of a liquid according to the present invention, with the parts in the rest or non-dispensing positions.
Figure 3:
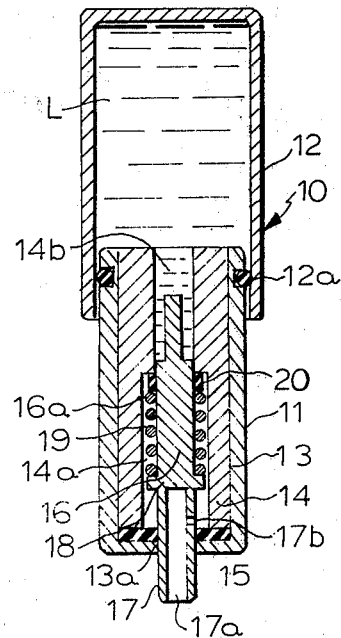
FIG. 3 is a view similar to FIG. 1 with the parts in the dispensing positions.
Figure 2:
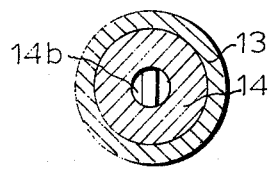
FIG. 2 is a section taken on line 2—2 of FIG. 1.

In its simplest form as seen in FIGS. 1–3, the device of the invention comprises a piston-cylinder means generally indicated at 10 which in this embodiment has a piston 11 over which a cylinder 12 is slidable. A gasket 12a in the end of the piston 11 seals against the inside surface of the cylinder 12 as the cylinder slides along the piston. The piston 11 is made up of an outer shell 13 within which is positioned an inner body 14. The end of the shell 13 has an aperture 13a therein and on the inside of the shell between the bottom thereof and the end of the inner body 14 is a first annular sealing gasket 15. The inner body 14 has a larger diameter recess 14a in the end toward the bottom of the shell, and has a smaller diameter bore 14b extending from the inner end of the recess 14a to the end of the piston which is within the cylinder 12.

Movably mounted within the recess 14a and bore 14b is a metering valve stem generally indicated at 16 which has a solid stem portion within the recess 14a and a hollow stem portion 17 extending from the solid stem portion out through the first annular sealing gasket 15 and the aperture 13a in the bottom of the shell 13, the outside surface of the hollow stem portion 17 being in sealing relationship with the first annular sealing gasket 15. At the joint between the hollow stem portion 17 and the solid stem portion is a flange 18, which in the rest position of the stem, as shwon in FIG. 1, rests on the first annular gasket 15. The cross-sectional shape of the solid stem portion is such that it will move freely into the bore 14b. Around the end of the bore 14b where it opens into the larger diameter recess 14a is a second annular sealing gasket 20 through which the solid portion of the stem can move in sealing relationship therewith when the stem 16 is raised. A spring 19 is positioned between the second annular sealing gasket 20 and the flange 18, and urges the flange toward the first annular sealing gasket 15.

In the hollow stem portion 17 is an aperture 17b which in the rest position of the device as shown in FIG. 1 is below or outside the bottom of the piston 11. In the dispensing position this aperture is within the larger diameter recess 14a.

It will be seen that the valve stem 16 and the inner body 14 with its larger diameter recess 14a, the annular sealing gaskets 15 and 20, and the spring 19 from a simple metering stem which is known from the aerosol dispensing art and is shown in U.S. Pat. No. 2,721,010.

In operation, with the parts in the positions as shown in FIG. 1, and with the cylinder filled with liquid L, pressure is exerted against the bottom of the hollow stem portion 17 and the top of the cylinder 12 to urge the cylinder along the piston 11 to thereby exert pressure on the liquid L within the cylinder and within the smaller diameter bore 14b and larger diameter recess 14a. The opposing forces move the stem 16 into the piston 11 against the action of the spring 19, first causing the upper end of the solid portion of the stem 16 to move into the second annular sealing gasket 20 and seal off the recess 14a from the smaller diameter bore 14b and the interior of the cylinder 12 thus trapping a metered quantity of liquid in recess 14a. Thereafter, further movement of the stem 16 causes the aperture 17b to move past the first annular sealing gasket 15 into the recess 14a.

It has been found that with this construction, when the aperture 17b moves into the recess 14a, the liquid which has been trapped in the recess 14a is ejected from the hollow stem portion 17 in a squirt which has considerable force.

Figure 4:
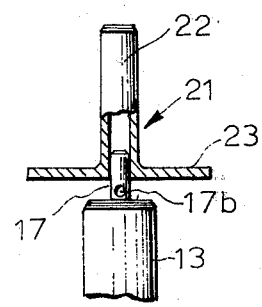
FIG. 4 is a partial elevation view, partly in section, showing a gripping means on the device of FIG. 1.

Obviously, if the device is made in a small size, such as can fit into a purse or the like, the end of the hollow stem portion 17 will be somewhat difficult to grasp with the fingers in such a way as not to block the hollow within the stem portion. To make the device easier to handle, a finger grip member 21, as shown in FIG. 4, can be mounted on the hollow stem portion 17, which finger grip member has a hollow extension 22 which forms an extension of the hollow stem portion 17, and laterally extending finger engaging portions 23. The index and middle fingers can be engaged over the finger engaging portions and the thumb pressed against the cylinder 12 to exert the opposing forces described above.

Figure 5:
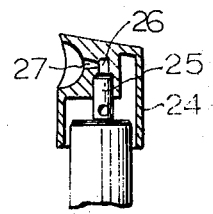
FIG. 5 is a partial elevation view, partly in section, showing a spray head on the device of FIG. 1.

A spray head, such as the spray head 24 shown in FIG. 5, can also be mounted on the hollow stem portion 17 in order to direct the squirt of liquid as a spray. The spray head 24 has a hollow recess 25 to receive the end of the hollow stem portion 17, and from the hollow recess a passage 26 extends to a spray nozzle 27, which in this embodiment opens laterally of the spray head 24. Pressure can be exerted on the top of the spray head 24 by, for example, the index finger and on the cylinder 12 by the thumb to produce the opposing forces described above. Obviously the spray nozzle 27 could be directed in the same direction as the hollow stem portion 17.

There has thus been provided an extremely simple device which can be made, for the most part, of easily molded plastic parts, in this instance only four such parts. Three easily formed and for the most part readily available gaskets and a single spring make up the rest of the device. It is easily assembled and filled on automatic machinery and can thus be produced at a cost which makes it a throwaway item, i.e., after the user empties it, it can be thrown away and a new filled device purchased.

The device can be used to dispense a wise variety of liquids, such as mouth fresheners, anticeptics, food products such as artificial sweeteners in liquid form, and the like.

Figure 6:
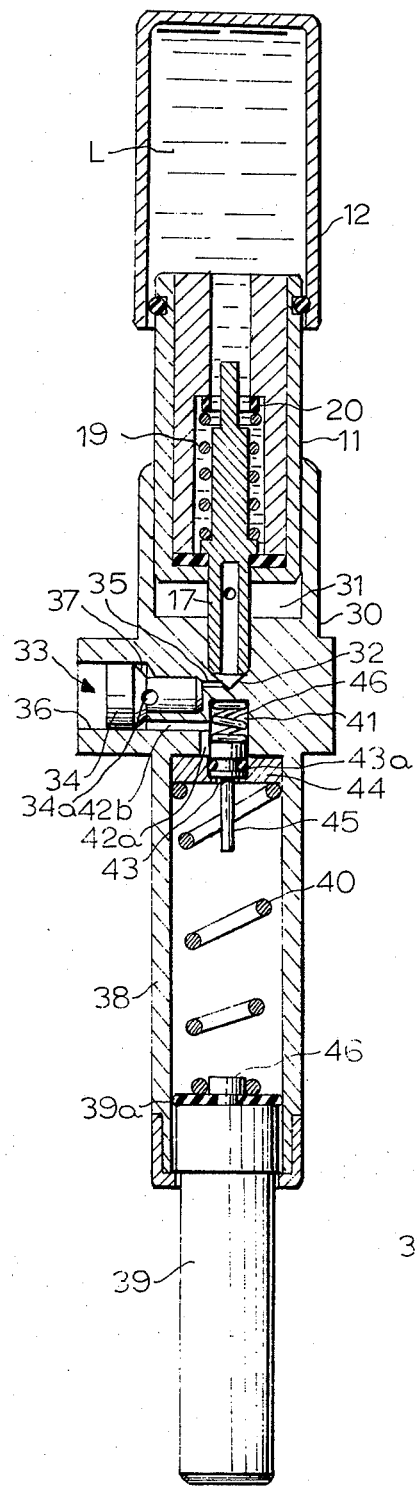
FIG. 6 is a sectional elevation view of a pressurized air dispenser in which the device of FIG. 1 has been incorporated with the parts in the rest or non-dispensing position.
Figure 8:
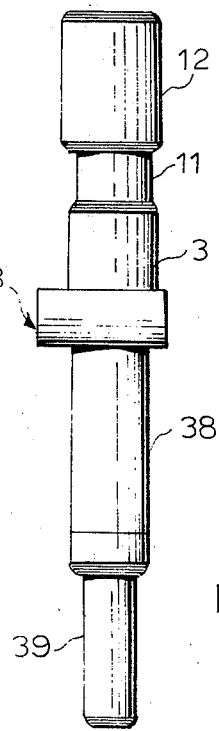
FIG. 8 is an elevation view, on a reduced scale, of the device of FIG. 6.
Figure 7:
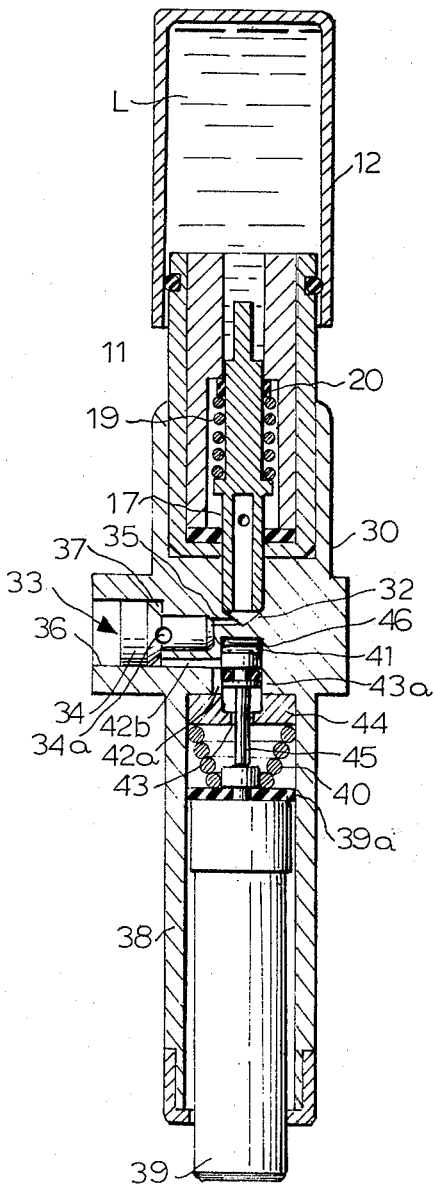
FIG. 7 is a view similar to FIG. 6 with the parts in the dispensing positions.

The device can be incorporated as the source of pressurized liquid into a liquid spray dispensing device of the type disclosed in an application filed concurrently herewith in the names of Roger Caron and Chester Luke Ser. No. 411,267 now abandoned, and entitled PRESSURIZED PRODUCT DISPENSER, and which discloses a device for dispensing a liquid product which has been placed under pressure in compressed air. The manner in which the device of the present invention is incorporated is shown in FIGS. 6–8. In the dispenser body 30 is an upwardly open recess 31 having a cross-sectional shape complementary to the cross-sectional shape of the piston 11 of the measured dose dispenser and into which the piston 11 fits in slidable relationship. A further recess 32 is provided in the bottom of the recess 31 which has a cross-sectional shape complementary to the cross-sectional shape of the hollow stem portion 17 and which receives the hollow stem portion 17 in a substantially fluid tight fit with the end of the stem portion 17 in the bottom of the recess 32 and, with the parts in the rest or non-dispensing positions as seen in FIG. 6, with the lower end of the piston 11 spaced above the bottom of the recess 31. It will thus be seen that pressure exerted on the end of the cylinder 12 will force the piston downwardly into the recess 31 while the stem 16 is held in a fixed position relative to the dispenser body 30, and therefore the parts move relative to each other in the same way as if the stem 16 is forced into the piston 11. The measured dose dispenser thus dispenses a measured dose through the hollow stem portion 17 into the recess 32.

Nozzle means 33 in the form of a nozzle insert 34 opens out of the side of the dispenser body 30, and the dispenser body has a liquid product flow path therethrough in the form of a passage 35 from the recess 32 to the center passage of the nozzle insert 34.

The nozzle insert 34 is positioned in a laterally opening recess 36 in the dispenser body 30 which is shaped to leave a supply chamber 37 around the nozzle insert, and the nozzle insert has lateral openings 34a extending from the supply chamber into the central passage of the nozzle insert.

Air compressing piston cylinder means are provided on the opposite end of the body 30 from the measured dose dispenser, and in the embodiment disclosed comprise a cylinder 38 which extends downwardly from the body 30 and within which a piston 39 is slidably positioned. Gasket 39a seals the piston in its movement into the cylinder 38. A return spring 40 within the cylinder 38 urges the piston 39 out of the cylinder 38. Opening out of the inner end of the cylinder 38 and into the body 30 is a recess 41, and from the recess 41 a compressed air bore having a vertically extending portion 42a and a horizontal portion 42b extends to the supply chamber 37. The recess 41 and the air bore comprise a compressed air flow path through the body 30.

Within the recess 41 is a poppet valve member 43 which seats on a seat 44 formed in a member which is positioned in the inner end of the cylinder 38 and which covers the recess 41, and a gasket 43a on the poppet valve member 43 seals the poppet valve member and the recess so that air cannot pass the poppet valve 43 from the cylinder to the vertical portion 42a of the air bore. A valve return spring 46 in the recess 41 holds the poppet valve on the seat 44. An actuating pin 45 extends downwardly from the poppet valve 43 into the cylinder 38. At the inner end of the stroke of the piston 39, it is engaged by an abutment member 46 to lift the poppet valve 43 from the seat 44 sufficiently far to pass compressed air into the vertical portion 42a of the air bore.

In operation, when pressure is exerted by the fingers of the user on the cylinder 12 of the measured dose dispenser and the piston 39 of the air compressing piston-cylinder means, the measured dose dispenser is caused to operate to dispense a squirt of liquid through the hollow stem portion 17 into the product passage 35 and into the nozzle insert 34. At the same time, air is compressed in the cylinder 38 ahead of the piston 39. However, until the piston 39 reaches the end of its stroke, the poppet valve 43 remains closed. When the actuating pin 45 is hit by the abutment member 46, the poppet valve is lifted from the seat 44, as shown in FIG. 7, and the air compressed in the cylinder 38 is suddenly released to flow through the compressed air path to the supply chamber 37 around the nozzle insert 34. From the supply chamber 37 it flows into the stream of liquid under pressure from the measured dose dispenser which is flowing through the center of the nozzle insert. The liquid is then dispensed from the nozzle insert as a fine spray of droplets of the liquid in compressed air.

In addition to the advantages for such a device as described in the above-mentioned copending application, the present device can be reused simply by replacing the throwaway measured dose dispensing device which forms the supply of pressurized liquid. In addition to dispensing only a measured dose, the valve means of the measured dose dispenser acts to control the flow of the liquid product from the liquid supply in a simple and effective manner and independently of the air valve controlling the flow of the compressed air from the air compressing piston-cylinder means.

Many changes will be obvious to those skilled in the art. For example, a cylinder is shown as slidable over the piston in the measured dose dispenser. A simple redesign of these parts would make possible the movement of a piston into a cylinder. The same is true of the air compressing piston-cylinder means. Redesign could make possible the sliding of a cylinder over a fixed piston. In addition, the flow of the compressed air and the liquid into the nozzle insert could be reversed if the spray effect desired would be better obtained with such a reversal.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merly preferred embodiments thereof.

What is claimed is:

1. A measured dose dispensing device comprising a piston-cylinder means for containing a body of liquid to be dispensed and having a piston member and a cylinder member, one member being engageable by the finger of a user to move it toward the other member for placing the liquid therein under pressure, said other member of said piston-cylinder means having a larger diameter recess therein at the end remote from said one member and a smaller diameter bore extending between said larger diameter recess and the space within said piston-cylinder means which contains said body of liquid, and a spring loaded stem extending through and movable through said recess and having a hollow stem portion on the end away from said one member of said piston-cylinder means and projecting out of said other member for engagement by another finger of the user to exert pressure thereon in the opposite direction from the pressure on the one member, said hollow stem portion being movable into and out of said other member of said piston cylinder means and having a solid stem portion with the same cross-sectional shape as said smaller diameter bore and movable into said bore when said stem is moved toward said one member for closing off the communication of said recess with said body of liquid during the initial movement of said stem into said one member, said hollow stem portion having an aperture therein which when the stem portion is out of the recess is out of communication with said recess and near the end of the movement of said hollow stem portion into said recess is placed in communication with said recess, whereby an amount of liquid corresponding to the volume of said recess is dispensed through said hollow stem portion.

2. A measured dose dispensing device as claimed in claim 1 further comprising a finger grip means on said hollow stem.

3. A measured dose dispensing device as claimed in claim 1 further comprising a spray head on said hollow stem.

4. A measured dose dispensing device as claimed in claim 1 in which said one member of said piston-cylinder means is a cylinder and the other member is a piston, said cylinder being movable over said piston.

5. A dispenser for dispensing liquid product in fine droplet form in compressed air, comprising a dispenser body, nozzle means opening out of said dispenser body, an air compressing piston-cylinder means mounted on said body and having a fixed member and a movable member movable relative to the fixed member through a compression stroke to compress the air, said body having a compressed air flow path therethrough from said air compressing piston-cylinder means to said nozzle means for conducting compressed air from said air compressing piston-cylinder means to said nozzle means, a valve member in said body and normally obturating said compressed air flow path, actuating pin means operatively associated with the movable member of said air compressing piston-cylinder means and said valve member for positively actuating said valve member to open said compressed air flow path near the end of said compression stroke only when said air compressing piston-cylinder means has compressed air to a predetermined pressure, a recess in said dispenser body, said body having a product flow path from said recess to said nozzle means, a measured dose dispensing device movably positioned in said recess and comprising a piston-cylinder means for containing a body of liquid to be dispensed and having two members, one member extending out of the recess and being movable toward the other for placing the liquid therein under pressure, and a metering valve means mounted on said other member of said piston-cylinder means and having a hollow stem portion projecting out of said other member into said recess and in communication with said product flow path, said hollow stem portion being movable into and out of said other member of the piston-cylinder means for valving a measured amount of liquid from the piston-cylinder means when said other member is moved into said recess while said hollow stem portion is abutted against the inner end of said recess.

6. A dispenser as claimed in claim 5 in which said one member of said piston-cylinder means is a cylinder and the other member is a piston, said cylinder movable over said piston, said piston, being movably positioned in said recess.

7. A dispenser as claimed in claim 5 in which said air compressing pistons cylinder means and the measured dose dispensing device are on opposite ends of said dispenser body.

8. A dispenser as claimed in claim 5 in which said nozzle means comprises a venturi having a converging-diverging passage and lateral passages opening therinto, and said product flow path extends to said converging-diverging passage and said compressed air flow path extends to said lateral passages.

* * * * *